United States Patent
Koegel et al.

[11] Patent Number: 6,101,797
[45] Date of Patent: Aug. 15, 2000

[54] METHOD AND APPARATUS FOR MACERATING PLANT MATERIAL

[75] Inventors: Richard G Koegel, Madison; Richard J Straub, Brooklyn; Timothy J Kraus, Madison, all of Wis.

[73] Assignees: United States of America, Washington, D.C.; Wisconsin Alumni Research Foundation, Madison, Wis.

[21] Appl. No.: 09/270,465

[22] Filed: Mar. 15, 1999

Related U.S. Application Data

[62] Division of application No. 08/884,277, Jun. 27, 1997.
[60] Provisional application No. 60/020,782, Jun. 28, 1996.

[51] Int. Cl.[7] .................................................. A01D 34/00
[52] U.S. Cl. ........................ 56/14.5; 56/16.4 A; 56/164 B
[58] Field of Search .............................. 56/16.4 B, 16.4 A, 56/16.4, 16.4 R, 14.5

[56] References Cited

U.S. PATENT DOCUMENTS

| | | | |
|---|---|---|---|
| 4,265,078 | 5/1981 | Krutz .................................. | 56/14.4 |
| 4,445,313 | 5/1984 | Elliott et al. ......................... | 56/16.4 |
| 4,747,260 | 5/1988 | Petrasch et al. ..................... | 56/505 |
| 4,862,681 | 9/1989 | Linde et al. ......................... | 56/16.4 |
| 5,036,652 | 8/1991 | Schmittbetz et al. ................ | 56/16.4 R |
| 5,056,302 | 10/1991 | Rosenbalm et al. ................. | 56/16.4 R |
| 5,152,127 | 10/1992 | Koegel et al. ....................... | 56/14.1 |
| 5,269,124 | 12/1993 | Barthel et al. ....................... | 56/16.4 |
| 5,498,207 | 3/1996 | Cappon et al. ....................... | 460/119 |
| 5,657,621 | 8/1997 | Mendes et al. ...................... | 56/16.4 R |
| 5,894,716 | 4/1999 | Haldeman et al. ................... | 56/14.5 |

FOREIGN PATENT DOCUMENTS

| | | | |
|---|---|---|---|
| 0408850 | 1/1991 | European Pat. Off. ............... | 56/16.4 |
| 3939659 | 6/1991 | Germany ............................. | 56/16.4 R |
| 4025580 | 2/1992 | Germany ............................. | 56/16.4 |
| 4113630 | 10/1992 | Germany ............................. | 56/16.4 |
| 405103527 | 4/1993 | Japan ................................... | 56/16.4 |
| 1166715 | 7/1985 | U.S.S.R. .............................. | 56/16.4 R |
| 1456049 | 2/1989 | U.S.S.R. .............................. | 56/16.4 |
| 1681761 | 10/1991 | U.S.S.R. .............................. | 56/16.4 |
| 2019731 | 11/1979 | United Kingdom ................. | 56/16.4 R |
| 2140664 | 12/1984 | United Kingdom ................. | 56/16.4 R |
| 2162035 | 1/1986 | United Kingdom ................. | 56/16.4 R |

*Primary Examiner*—Robert E. Pezzuto
*Assistant Examiner*—Arpad Fabian Kovacs
*Attorney, Agent, or Firm*—Frank A. Seemar; Larry W. Miller; J. William Stader

[57] ABSTRACT

Method for processing plant material in which a first rotatable crushing roller with an outer generally cylindrical surface cooperates with a second adjacent rotatable crushing roller also having an outer generally cylindrical surface. The rollers, mounted with their surfaces positioned in close proximity to each other, rotate in opposite directions to receive and crush plant material. A rotatable impact rotor having a plurality of outwardly extending projections is mounted rearwardly of the crushing rollers for impacting plant material that has passed between the rollers to macerate the plant material that has been previously crushed by the rollers. The crushed and macerated plant material is diverted and again impacted one or more times by the outwardly extending projections of the impact rotor.

6 Claims, 6 Drawing Sheets

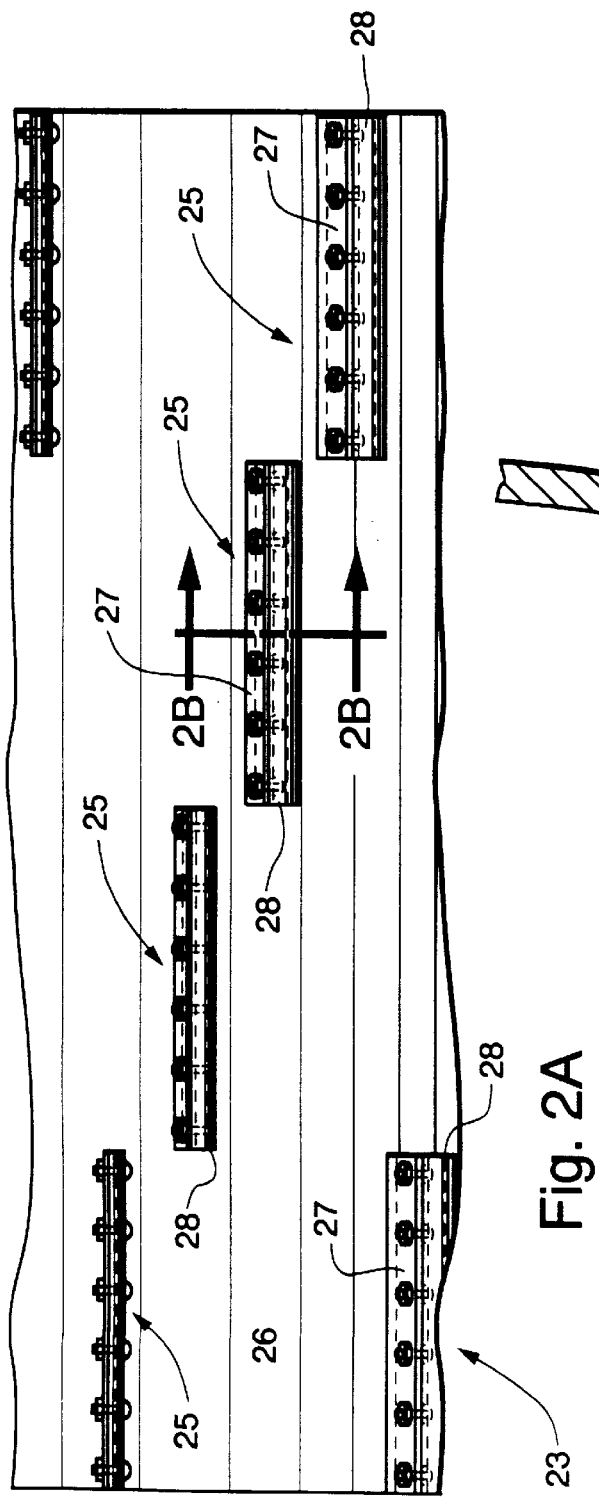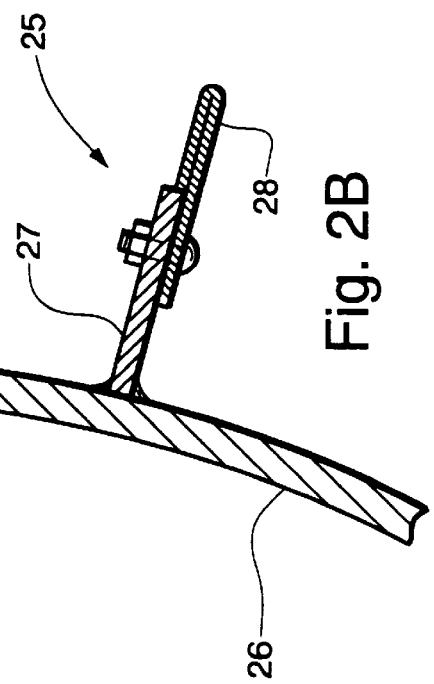

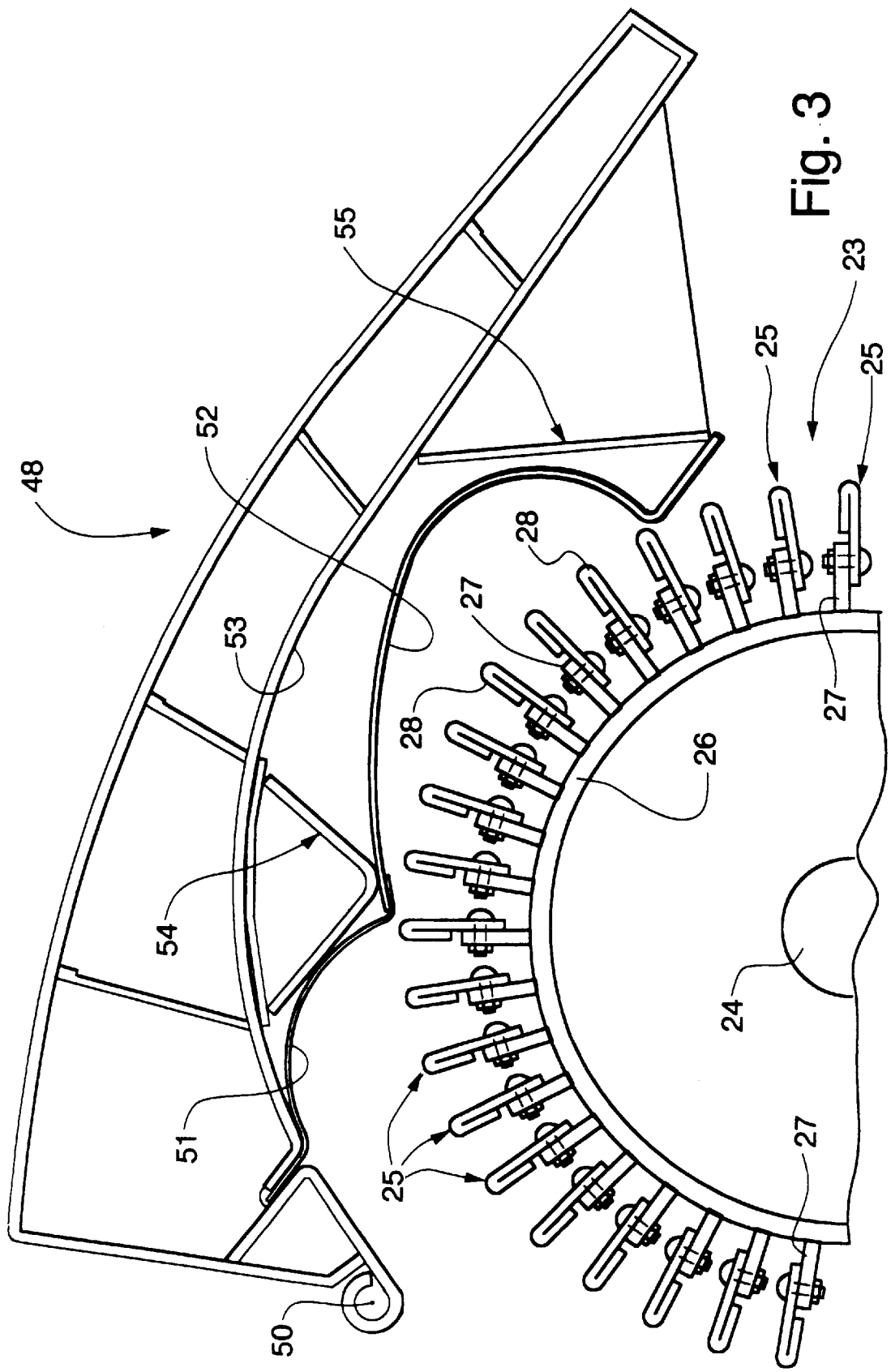

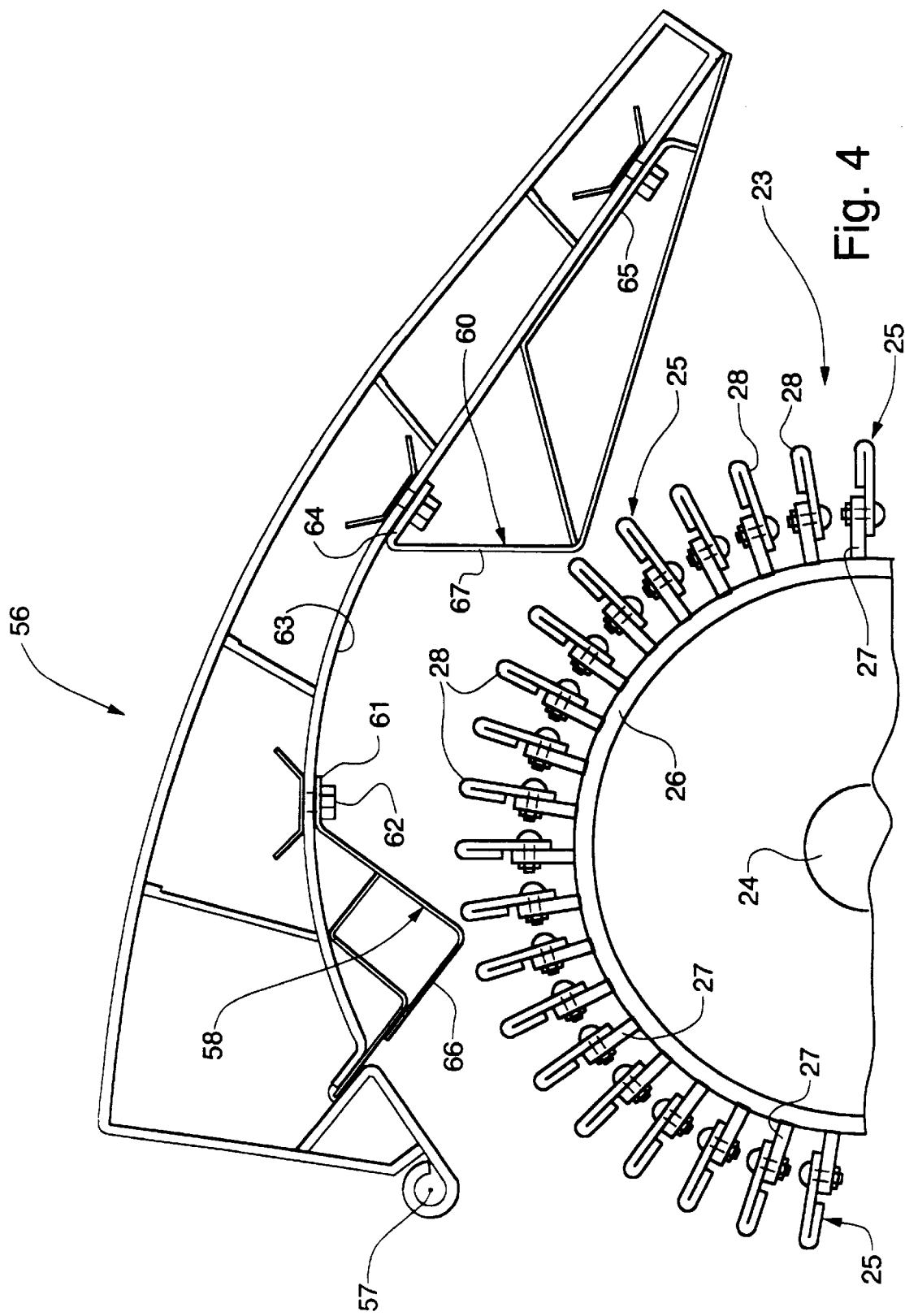

METHOD AND APPARATUS FOR MACERATING PLANT MATERIAL

CROSS REFERENCE TO RELATED APPLICATION

This application claims the benefit of U.S. Provisional Application No. 60/020,782, filed Jun. 28, 1996, entitled Method and Apparatus for Macerating Plant Material, and is a divisional of copending U.S. patent application Ser. No. 08/884,277, filed Jun. 27, 1997, entitled "Method and Apparatus for Macerating Plant Material.

FIELD OF THE INVENTION

The present invention relates generally to a method for severely conditioning plant material and more particularly to a method for macerating plant material by first crushing the material and then impacting and reimpacting the crushed plant material.

BACKGROUND OF THE INVENTION

During the process of producing and harvesting hay it is common to condition stalky plant material such as alfalfa, clover, or the like, by crimping the stems. This cracks the stems and thereby reduces the time cut plant material remains in the field by increasing the rate at which moisture escapes. U.S. Pat. No. 4,445,313, issued May 1, 1984 in the name of Thomas Elliott et al, discloses a machine illustrative of the general principle of conditioning by crimping. Another example of prior art showing conditioning by crimping is U.S. Pat. No. 4,862,681, issued Sep. 5, 1989 in the name of Gilbert W. Linde et al, which discloses conditioning rolls that crimp and also reciprocate relative to each other to enhance the conditioning.

In addition to crushing or crimping, it is also well known that plant drying can be further enhanced by subjecting the crushed plants to additional conditioning that causes the plant stems to be severely crushed and/or fiberized. This very severe conditioning is commonly referred to as maceration. The various levels of conditioning to which plant materials are subjected has a direct affect on the drying rate. Another benefit of severe conditioning, i.e., maceration, is that studies have shown that macerated hay enhances digestibility. Maceration is also carried out as a precursor to juice expression from herbage, where industrially valuable products, such as enzymes or nutritional substances are then extracted from the plant juice.

An example of prior art apparatus for macerating plant material, such as forage crops, is shown in U.S. Pat. No. 4,265,076, issued May 5, 1981 in the name of Gary W. Krutz, wherein a self propelled implement is disclosed. The crop material is macerated by a pair of opposing crushing rolls with differential peripheral speeds, after which it is conveyed to a press to form a mat that is discharged rearwardly onto the field over which the implement is being operated.

Another example of prior art apparatus for macerating plant material, also referred to as herbage, is shown in U.S. Pat. No. 5,152,127, issued on Oct. 2, 1992 in the name of Richard G. Koegel et al ("'127 patent"), This patent, hereby incorporated by reference in its entirety, provides an extensive explanation of background material relating to severe conditioning. The '127 patent discloses an implement for processing herbage, such as forage crop material, by cutting standing crop, feeding the cut crop material to a pair of crushing rollers to initially crack the stems of the plants, and subsequently impacting the crushed forage crop material to provide additional fiberization.

The present invention contemplates an improvement over known methods.

SUMMARY OF THE INVENTION

An important object of the present invention is to provide a simple and reliable method for treating plant material by reimpacting plant material one or more times after it has been crushed and impacted.

In pursuance of this and other important objects, the present invention contemplates a method for treating plant material comprising the steps of crushing plant material, expelling the crushed plant material in a downstream direction, guiding the crushed plant material into the path of impacting means after it has been crushed, impacting the crushed plant material, guiding the impacted plant material into the path of the impacting means, and reimpacting the impacted plant material.

More specifically, in one embodiment the present invention contemplates an improved method for processing plant material wherein the apparatus employed comprises a first rotatable crushing roller having an outer generally cylindrical surface, a second rotatable crushing roller having an outer generally cylindrical surface positioned in close proximity to the outer surface of the first roller, the first and second rollers being adapted to rotate in opposite directions to form crushed plant material under conditions where such material is passed between the rollers and urged downstream, a rotatable impact rotor having a plurality of outwardly extending projections, the impact rotor being mounted downstream from the first and second rotatable crushing rollers and in the path of crushed plant material that has passed between the rollers, whereupon the crushed material is impacted by the outwardly extending projections to macerate the crushed plant material, and means mounted outwardly of the impact rotor to divert the macerated plant material back into the impact rotor for reimpaction by the outwardly extending projections of the impact rotor.

In another embodiment, the present invention contemplates a method wherein the apparatus that accomplishes impaction and reimpaction of plant material being processed comprising the addition of unique diverters adjacent the outer periphery of an impaction rotor of the type employed in the apparatus of the '127 patent. By placing one or more diverters in the path of previously crushed material, the material is propelled by the impaction rotor against such one or more diverters which direct it back into the impacting rotor. Thus, by increasing the number of operative diverters the number of impacts carried out on the material being processed is varied, and, consequently, maceration intensity can be varied in accordance with the desired degree of conditioning and with the condition and type of material being handled. For example, when the vegetation being processed is mature and requires a high level of processing due to its mechanically stronger state, the number of diverters can be increased over the number used when the vegetation is less mature.

The foregoing and other objects, features and advantages of the invention will appear more fully hereinafter from a consideration of the detailed description which follows, in conjunction with the accompanying sheets of drawings wherein one principal embodiment of the invention is illustrated by way of example, along with other alternative embodiments. It is to be expressly understood, however, that the drawings are for illustrative purposes and are not to be construed as defining the limits of the invention.

DESCRIPTION OF THE DRAWINGS

FIG. 2A is a view taken in the direction of arrows 2A—2A in FIG. 2.

FIG. 2B is a view taken in the direction of arrows 2B—2B in FIG. 2A.

FIG. 3 is a partial diagrammatical elevational view similar to FIG. 2 showing key elements of another embodiment in which the present invention is readily carried out.

FIG. 4 is a partial diagrammatical elevational view similar to FIG. 2 showing key elements of yet another embodiment in which the present invention is readily carried out.

DESCRIPTION OF THE INVENTION

Figure 1:
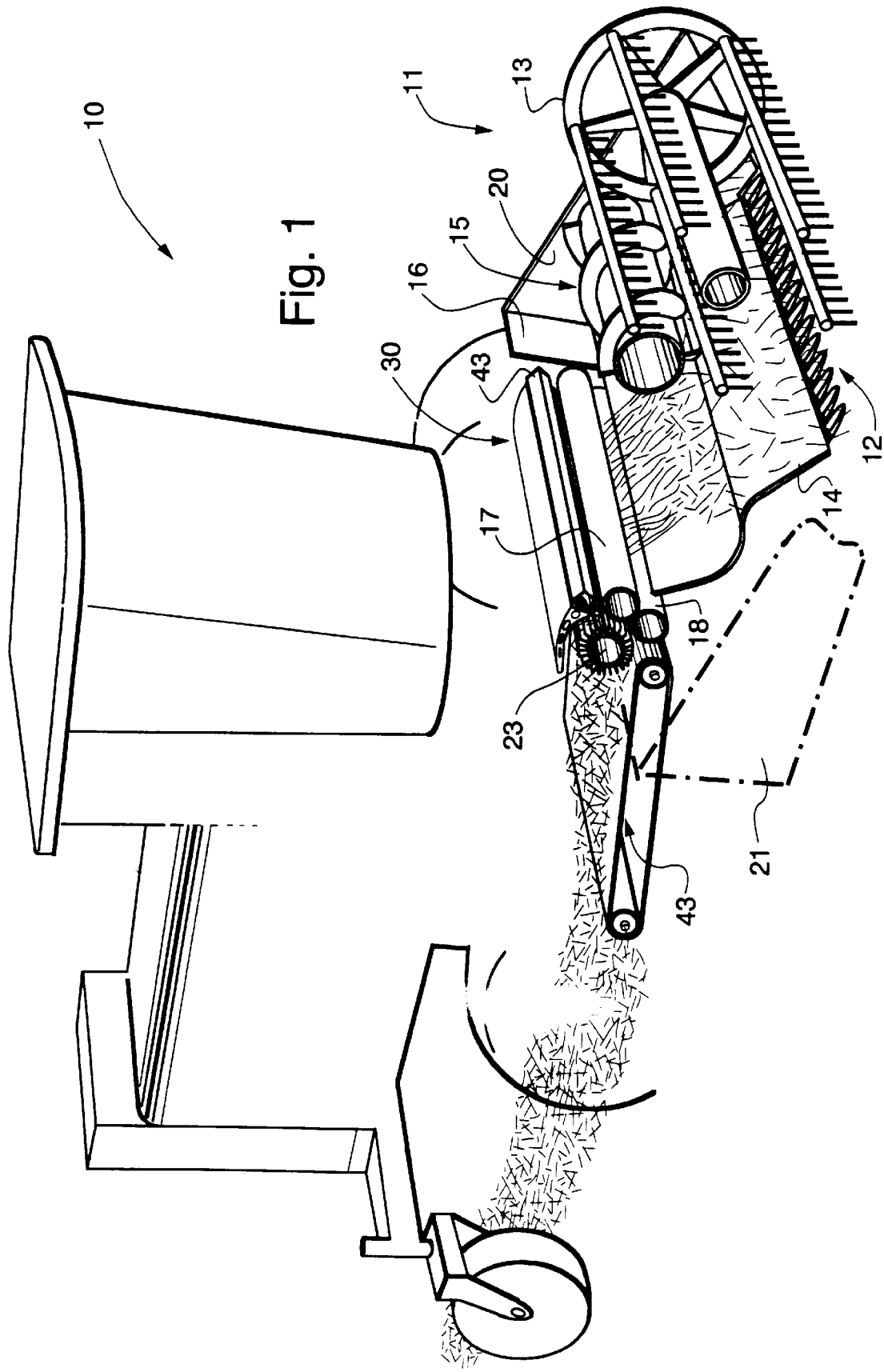
FIG. 1 is a diagrammatical perspective view of self propelled harvesting apparatus in which the present invention is readily carried out.

Referring now to the drawings for a more detailed description of the present invention, FIG. 1 diagrammatically shows a self propelled implement, designated by reference numeral 10, having a forwardly extending header 11 suspended from a frame in a conventional manner. The header includes a forwardly positioned transverse cutterbar 12 disposed in close proximity to the ground to sever standing plant material, a reel 13 for engaging the severed plant material and conveying it rearwardly over a floor 14, and a transverse auger 15 that consolidates the rearwardly conveyed plant material and discharges it through an opening (not shown) in a wall 16 extending upwardly from floor 14. The structure and function of header 11 is well known in the art, an example of which is shown and described in U.S. Pat. No. 5,327,709, issued Jul. 12, 1994 in the name of Bryant Webb, hereby incorporated by reference. The prior art elements of header 11 are depicted in a cut-away fashion to facilitate understanding.

Figure 2:
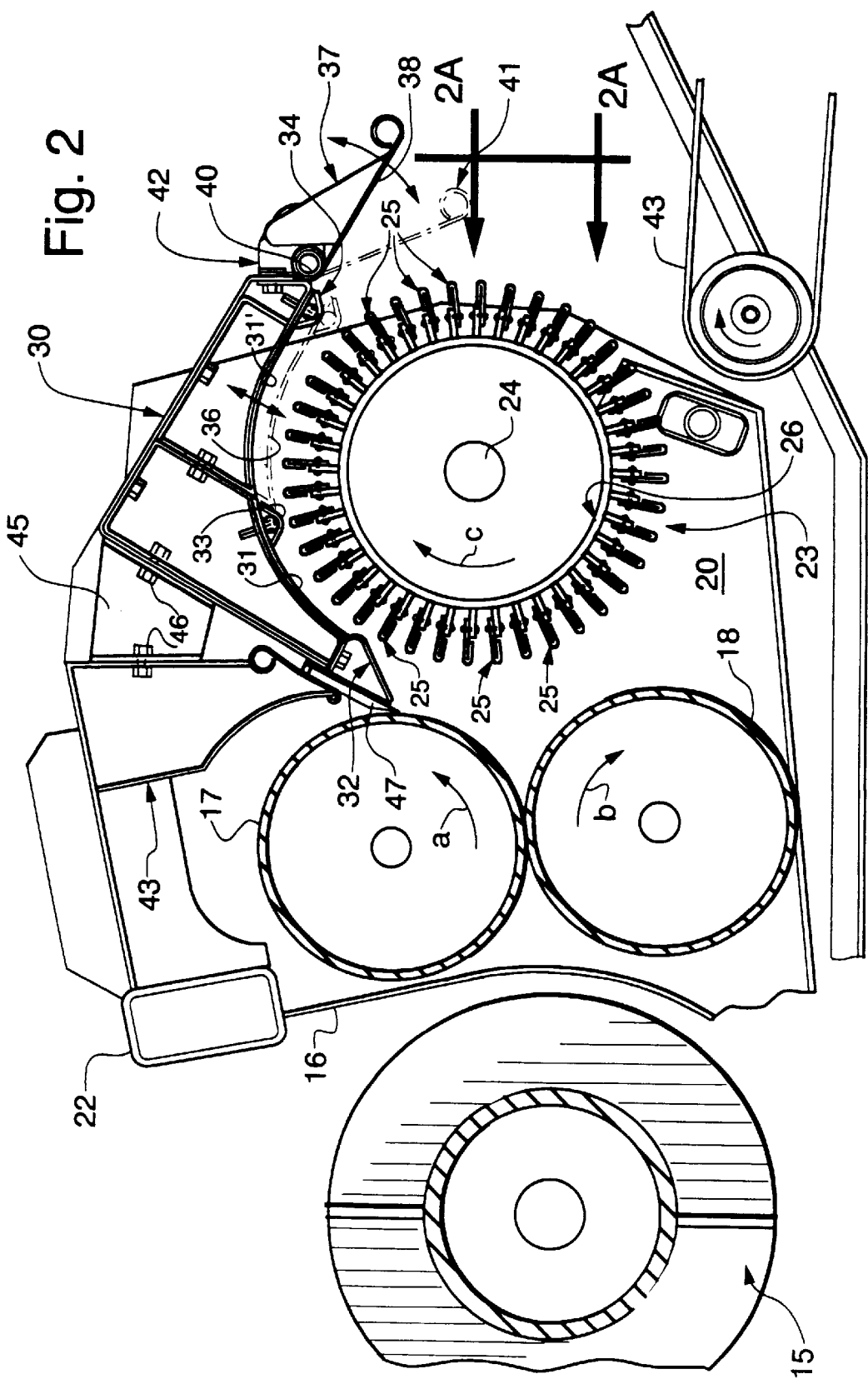
FIG. 2 is an elevational view illustrating in further detail the key elements of the apparatus shown in FIG. 1.

In the embodiment depicted in FIG. 1 and shown in further detail in FIG. 2, crushing rolls 17, 18 are rotatably mounted on header 11 behind wall 16 in general transverse alignment with auger 15. The rotational direction of crushing rolls 17, 18 is illustrated by directional arrows a and b in FIG. 2. Crushing rolls 17, 18 are journalled in bearing assemblies mounted on sides walls 20, 21 of header 11 and driven by conventional means, such as chains, belts, gears, hydraulics, or a combination thereof. To accomodate varying thicknesses of plant material being crushed, rolls 17, 18 can be spaced and/or spring loaded toward each other in a conventional manner. The outer surfaces of crushing rolls 17, 18 are aggressive to improve feeding characteristics.

As depicted in FIG. 1, side wall 21 is shown in phantom to illustrate its position and thereby provide an unobstructed view of the elements of harvester 10, some of which elements are cut-away, as noted above. Cross beam member 22, which provides structural support and strength to header 11, extends between sidewalls 20, 21. Rear wall 16, mounted to cross beam member 22, extends from side to side between auger 15 and crushing rolls 17, 18, and is provided with the discharge opening mentioned above for appropriate unimpeded ingress of material to crushing rolls 17, 18.

Impact rotor 23, also mounted on header 11, is similarly journalled in opposing bearing assemblies mounted on side walls 20, 21 adjacent crushing rolls 17, 18. Conventional drive means rotate impact rotor 23 in the direction of arrow c, i.e., in a clockwise direction when viewed from the right side of the apparatus shown in FIGS. 1 and 2, about transverse axis 24. The position of axis 24 is adjustable vertically and horizontally to modify the spacing and vertical relationship between crushing rolls 17, 18, and impact rotor 23.

More specifically, impact rotor 23 comprises a plurality of outwardly extending rigid fins 25 (see FIGS. 2A and 2B) equidistantly spaced along the outer surface of a cylindrical core 26. Each fin 25 includes a radially extending transverse strut 27 welded to core 26. An impact element 28 is affixed to each strut 27, which elements also extend in a generally radial direction and have a rounded leading edge. Referring to FIGS. 2A and 2B, in the preferred embodiment impact elements 28 are bolted to struts 27, which are affixed to core 26 in a staggered and segmented manner. Among others things, this segmented array enables replacement of separate segments due to wear or damage and greatly reduces time, effort and expense during routine servicing or field repair. Further, by staggering the segments from row to row, the adjacent staggered segments engage the crop in a sequential manner which reduces lateral load characteristics.

A deflector hood assembly 30, mounted between side walls 20, 21, comprises an inwardly facing arcuate surface 31, 31' to which a plurality of guide elements 32, 33, 34 are secured. More specifically, guide element 32 is triangularly shaped in cross section with a flat impact surface 35 in the downstream path of plant material that has been crushed by rolls 17, 18, impacted by rotor 23, and then impelled in a general upward direction. Surface 35 extends from side to side with its rear portion terminating in the vicinity of the cylindrical path of the tips of impact elements 28. Guide elements 33, 34, similar in configuration to each other, are angularly shaped and selectively attached along surface 31, 31'. Rearmost element 34 is radially adjustable relative to the cylindrical path of the tips of impact elements 28 by virtue of moveable segment 36 of inwardly facing wall 31, the innermost position of which is shown in phantom outline.

An auxiliary hood 37 comprises a flat inwardly facing deflection element 38 pivotally mounted to deflector hood assembly 30 at pivot assembly 40 for adjustment between an inner position 41 shown in phantom outline, and an outer position shown in solid lines. Deflection element 38, secured to pivot assembly 40 by two or more vertically disposed flanges 42, is continuous from side to side with its forward edge contiguous with the rearward edge of inwardly facing surface 31'. The purpose of the auxiliary hood is to vary the discharge path of processed material onto a conveyor 43, generally shown in FIG. 1 and partly shown in FIG. 2, operatively mounted downstream from impact rotor 23 for conveying processed crop rearwardly.

Intermediate frame assembly 44 is disposed between sidewalls 20, 21 to provide structural integrity via intermediate brackets 45 (one shown) affixed between deflector hood 30 and assembly 43 by bolts 46, or other suitable holding means. Attached to frame assembly 43 is scrapper 47 with an edge in operative relationship with the surface of crushing roll 17 for functioning in a well known manner.

In FIG. 3, an alternative embodiment is illustrated wherein similar crushing rolls are used in conjunction with impact rotor 23 and a deflector hood assembly 48, pivotally adjustable about transverse axis 50. Arcuate guide surfaces 51, 52 are affixed to the inner surface 53 of hood assembly 48 via intermediate retaining elements 54, 55. Plant material is engaged by surfaces 51, 52 in a manner similar to guide elements 32, 33 of the FIG. 2 embodiment, i.e., as it is being conveyed along a generally circumferential path after initial impaction. Guide surface 51 redirects the material back against impact elements 28 of impact rotor 23 whereupon reimpaction takes place that in turn redirects the material away from impact rotor 23 and into guide surface 52, which again redirects the material back toward impact elements 28 for another reimpaction to further macerate the plant material prior to being discharged from hood assembly 48 onto a rearwardly transporting conveyor 43 of the type depicted in FIGS. 1 and 2. In this embodiment the discharge path of the macerated material can be varied by pivoting hood assembly 48 about transverse axis 50.

In FIG. 4, another alternative embodiment is illustrated wherein similar crushing rolls are used in conjunction with impact rotor 23 and a deflector hood assembly 56, pivotally adjustable about transverse axis 57. In a manner similar to the FIG. 2 embodiment, guide elements 58, 60 are affixed to the inner surface of deflector hood 56 to engage plant material as it is being conveyed along its generally circumferential path. Guide element 58 is angularly shaped with a transverse flange 61 for receiving a plurality of bolts 62 (one shown) for securing it to the inner surface 63 of hood 56. In a like manner guide element 60 is angularly shaped and includes inwardly turned flanges 64, 65 for securement to the hood. Leading surface 66 of element 58 redirects material back against impact elements 28 whereupon reimpaction takes place that in turn redirects the material away from impact rotor 23 and into transverse leading surface 67 of element 60, which in turn again redirects the material against impact elements 28 of rotor 23 for additional reimpaction to further macerate the plant material prior to being discharged from the hood onto a rearwardly transporting conveyor. In this embodiment, as in the FIG. 3 embodiment, the rearward discharge path of the macerated plant material can be varied by pivoting hood assembly 56 about transverse axis 57.

Figure 5:
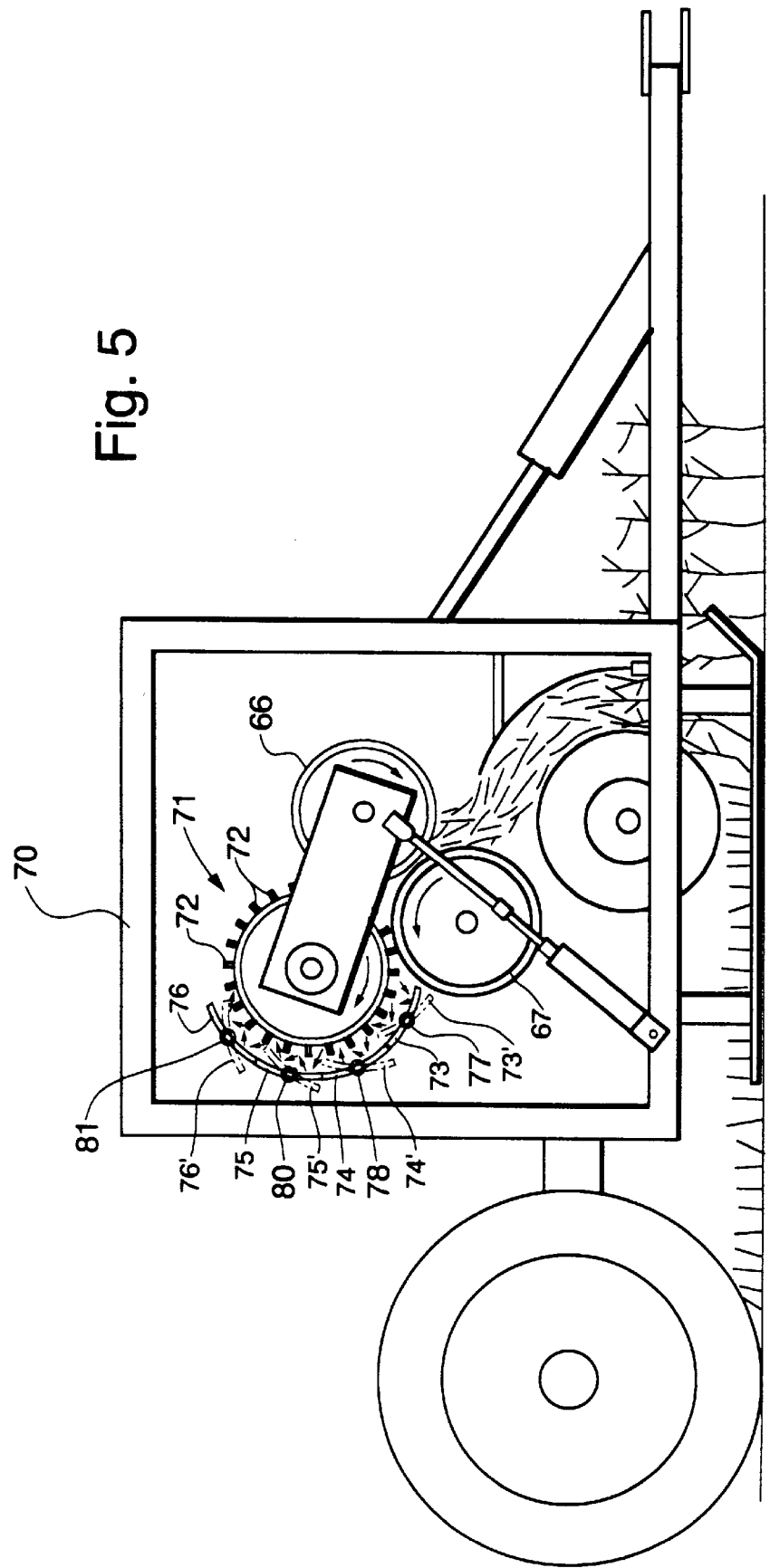
FIG. 5 is a diagrammatical elevational view illustrating still another embodiment in which the present invention is readily carried out.

In FIG. 5 key elements are diagrammatically shown of still another embodiment of structure in which the present invention may be carried out. In this regard reference is made to the abovementioned '127 patent, previously incorporated by reference, wherein apparatus having similar elements is shown and discussed. More specifically, the apparatus of FIG. 5 includes first and second counter rotating crushing rolls, 67, 68, mounted on frame 70 forwardly of an impact rotor 71 having outwardly extending projections 72. As in the '127 patent plant material passes between the crushing rolls after which it is directed against projections 72 of impact rotor 71. In close proximity to the periphery of the impact rotor are a plurality of arcuate diverter blades 73, 74, 75, 76 pivotally mounted for individual adjustment about pivots 77, 78, 80, 81 relative to the path of the plant material. Each blade is selectively adjustable from an outer position, where it is aligned with and substantially parallel to the circular path of the tips of projections 72 of rotor 71, to an inner position where the inner tip of the blade is adjacent the path of the tips of projections 72. For example, the inner positions of diverter blades 73, 74, 75, 76, are illustrated by reference numerals 73', 74', 75', 76', respectively. Thus, by selectively pivoting one or more of the diverter blades to its inner position, the material that has been crushed and impacted can be immediately redirected into the impact rotor for a selected number of additional impactions, each of which will progressively increase the degree of processing.

In operation, each of the above discussed configurations provides for crushing, impaction and reimpaction of plant material being processed. In the embodiment shown in FIG. 5, the impact rotor engages the crushed material as it rotates downwardly, whereas in the other arrangements the impact rotor impacts the crushed material as it rotates upwardly, but regardless of direction of rotation all configurations accomplish the unique function of reimpaction of plant material, e.g., forage crop material, that has been crushed and impacted. The invention FIG. 5 embodiment contemplates in general a method carried out by an impact rotor mounted downstream from a crushing assembly and adjacent a hood. Material crushed by the crushing assembly is thrust against the fins of the impact rotor, which is rotating at a relatively high rate of speed. For example, with the crushing rolls rotating at 800 RPM, a typical speed for the impact rotor would be in a range of 1000 RPM to 3000 RPM, depending on the type and maturity of the crop being processed. The crushed material is macerated by the impact of the fins and deflected one or more times back to an area adjacent the rotor where it engages a deflector which guides it along a generally circumferential path to a conveyor assembly, conveyed rearwardly, and subsequently deposited on the surface of the field as depicted in FIG. 1. A pressing assembly (not shown) can also be employed rearwardly of the deflector hood, in which case the material is pressed into a mat prior to being deposited on the field.

Of the many implicit and explicit advantages of the present invention one of the most important is the provision of a method that allows the extent of maceration of plant material to be selected within a wide range. This extends the application of the inventive method from moderate conditioning for accelerated field drying to very severe maceration where it is desired to express juice from the herbage as a source of value added products. Examples of potentially significant valuable value added products are livestock and/or food-grade protein concentrates, pigmenting agents for the poultry industry, and industrially valuable enzymes.

While preferred structure in which the principles of the present invention are carried out, is shown and described in the embodiments above, it is to be understood that the invention is not limited to such preferred structure, but that, in fact, widely different means of varying scope and configuration may be employed in the practice of the invention. Further, while the unique method of the present invention is discussed above, in some instances, as being adaptable to handle forage crop material, it is not intended that it be limited to that type of herbage.

What is claimed is:

1. A method for treating stalky plant material having tubular stems comprising the steps of crushing said plant material to crack said tubular stems, guiding said crushed plant material into the path of impacting means after it has been crushed, said impacting means comprising a plurality of impacting elements extending from a rotating core, impacting said crushed plant material, by utilizing said impacting means, to provide maceration that causes said stems to become more severely cracked, guiding said impacted plant material back into the path of said impacting means, and reimpacting said impacted plant material, by utilizing said impacting means, to provide addition maceration to said plant material that has been crushed and macerated.

2. A method for treating stalky plant material as set forth in claim 1 and further comprising the steps of guiding said reimpacted plant material back into the path of said impacting means, and reimpacting said reimpacted plant material, by utilizing said impacting means, to provide further maceration to said plant material that has been crushed, impacted to provide maceration, and reimpacted to provide additional maceration.

3. A method for treating stalky plant material as set forth in claim 1 comprising the additional step of harvesting said plant material prior to said crushing step.

4. A method for treating stalky plant material as set forth in claim 3 wherein said harvesting step comprises the additional steps of cutting said plant material under conditions where it is standing in the field, and conveying said cut plant material rearwardly.

5. A method for treating stalky plant material as set forth in claim 2 comprising the additional step of harvesting said plant material prior to said crushing step.

6. A method for treating stalky plant material as set forth in claim 5 wherein said harvesting step comprises the additional steps of cutting said plant material under conditions where it is standing in the field, and conveying said cut plant material rearwardly.

\* \* \* \* \*